(12) United States Patent
Robinson et al.

(10) Patent No.: US 11,126,851 B2
(45) Date of Patent: Sep. 21, 2021

(54) AUGMENTED REALITY LABELERS

(71) Applicant: Hewlett-Packard Development Company, L.P., Spring, TX (US)

(72) Inventors: Ian N. Robinson, Palo Alto, CA (US); Mithra Vankipuram, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/970,507

(22) PCT Filed: Apr. 19, 2018

(86) PCT No.: PCT/US2018/028380
§ 371 (c)(1),
(2) Date: Aug. 17, 2020

(87) PCT Pub. No.: WO2019/203838
PCT Pub. Date: Oct. 24, 2019

(65) Prior Publication Data
US 2021/0081670 A1 Mar. 18, 2021

(51) Int. Cl.
| | |
|---|---|
| *G06T 19/00* | (2011.01) |
| *G06K 9/00* | (2006.01) |
| *B65C 11/02* | (2006.01) |
| *G06T 19/20* | (2011.01) |

(52) U.S. Cl.
CPC ...... *G06K 9/00671* (2013.01); *B65C 11/0289* (2013.01); *G06T 19/006* (2013.01); *G06T 19/20* (2013.01); *G06T 2219/004* (2013.01)

(58) Field of Classification Search
None
See application file for complete search history.

(56) References Cited

U.S. PATENT DOCUMENTS

| | | | |
|---|---|---|---|
| 9,684,479 B1 | 6/2017 | Block | |
| 9,734,634 B1 * | 8/2017 | Mott | G06F 3/0304 |
| 9,800,744 B2 | 10/2017 | Grewal et al. | |
| 2013/0008962 A1 | 1/2013 | Anand | |
| 2013/0342856 A1 | 12/2013 | Boot et al. | |
| 2016/0352993 A1 * | 12/2016 | Gerasimow | G03B 7/17 |
| 2017/0109929 A1 | 4/2017 | Meier et al. | |
| 2017/0243402 A1 | 8/2017 | Weerasinghe | |
| 2018/0089902 A1 * | 3/2018 | Zhu | G06T 11/60 |

FOREIGN PATENT DOCUMENTS

| | | |
|---|---|---|
| WO | WO-2008028524 A1 | 3/2008 |
| WO | WO-2016190991 A1 | 12/2016 |

* cited by examiner

*Primary Examiner* — Nicholas R Wilson
(74) *Attorney, Agent, or Firm* — Tong Rea Bentley & Kim

(57) ABSTRACT

In example implementations, an augmented reality (AR) labeler is provided. The AR labeler includes a camera, a processor, a graphical user interface (GUI), and a display. The camera is to capture an image of an object. The processor is communicatively coupled to the camera to receive the image and determine object information. The GUI is communicatively coupled to the processor to receive print parameters. The display is communicatively coupled to the processor to display an AR image of the object with the print parameters, wherein the print parameters are modified in the AR image based on the object information.

10 Claims, 4 Drawing Sheets

AUGMENTED REALITY LABELERS

BACKGROUND

Labels are used in a variety of different industries and applications. Labels can be created on a print medium such as a paper, a sticker, and the like. Labels for objects may be designed offline based on a user's perception of the object. The label may provide information such as contents of a container, warning signs, identification information for a product packaging, and the like.

DETAILED DESCRIPTION

Examples described herein provide an augmented reality (AR) labeler. As discussed above, labels can be created to provide information. The labels may be created on a print medium and designed offline based on a user's perception of the object.

However, some objects may be curved (e.g., cylinders) or have irregular surfaces (e.g., bumps, lines, textured surfaces, and the like). As a result, when the label is created offline and applied to the object, the label may not appear as intended. For example, a label printed on a rectangular print medium may appear distorted when applied onto a cylindrical drum. The user may also want to create a label with features, e.g., font size, font color, background color, and the like, that complement the object being labeled, which may be difficult when the label is created separately from the object.

Examples herein provide an AR labeler that provides a print preview of a label on an AR image. The AR image may account for object information including the dimensions of the object, the surface characteristics, and the like. Thus, a user may create a label and the AR image may show the label as it would appear on the object based on the object information. Thus, when the label information is generated and printed, the label will appear on the object as it appeared in the AR image.

Figure 1:
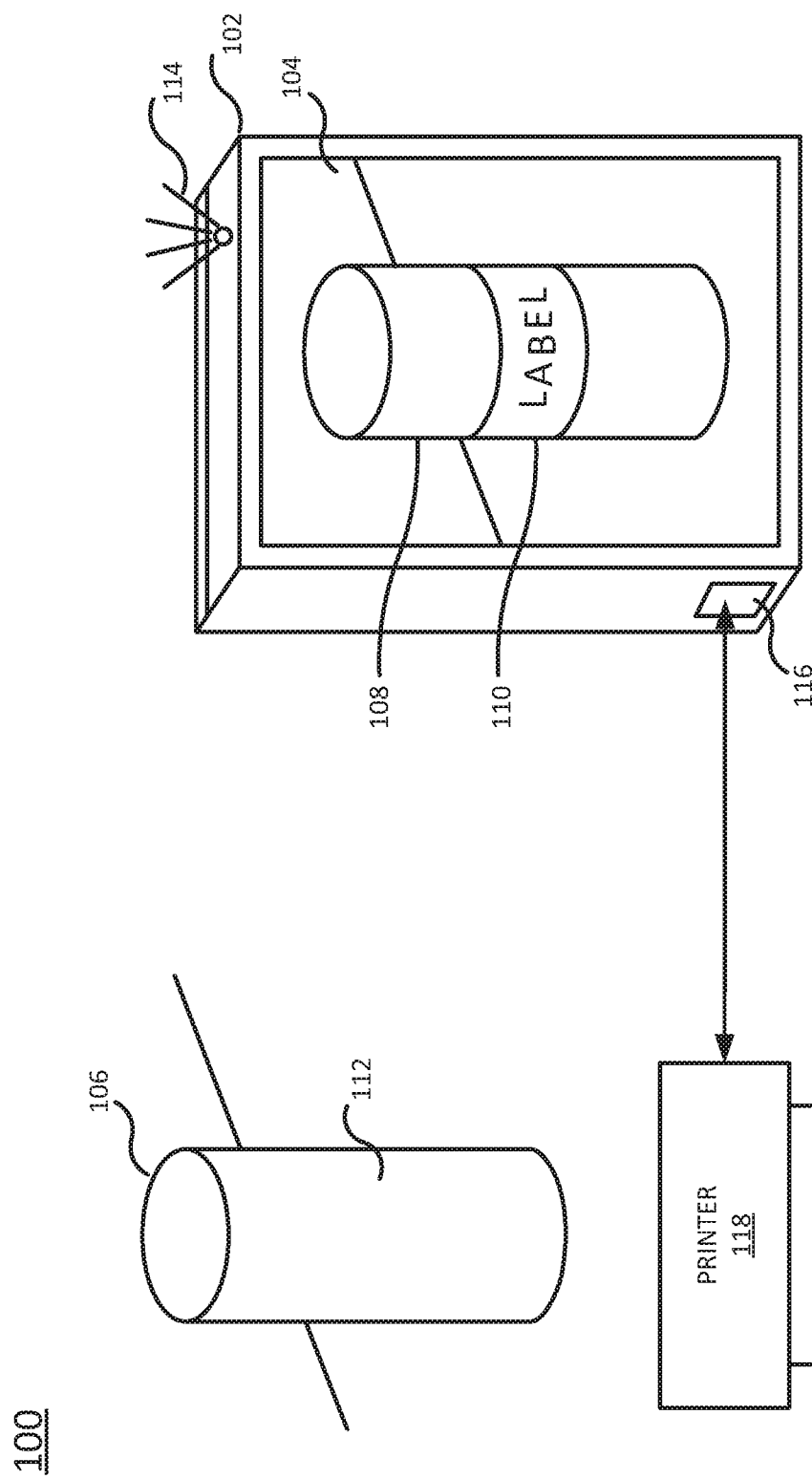
FIG. 1 is a block diagram of an example of an augmented reality (AR) labeler system of the present disclosure.

FIG. 1 illustrates a block diagram of an example augmented reality (AR) labeler system 100 of the present disclosure. In one example, the system 100 may include a device 102 and a printer 118. The device 102 may be an electronic device with a camera and a display, such as a smartphone, a tablet computer, and the like.

In one example, the device 102 may capture an image of an object 106 that is to receive a printed text or a label. Although the object 106 is illustrated as being a cylinder, it should be noted that the object 106 may have any shape. For example, the object 106 may be a sphere, a cube, a stack of materials, and the like.

The image of the object 106 may be displayed on a display 104 of the device 102. For example, the device 102 may provide an AR image 108 that shows what a label 110 may look like on the object 106. The label 110 may include alphanumeric text, graphical images, or a combination of alphanumeric text and graphical images.

In one example, the image may be a live feed of the object 106 in the AR image 108. For example, a camera of the device 102 may be turned on to capture a video image of the object 106. In one example, the image may be a photograph of the object 106 in the AR image 108.

In one example, the device 102 may analyze the image of the object 106 to identify object information associated with the object 106. In one example, the object information may include the dimensions of the object. For example, based on the field of view of the camera and an estimated distance from the object 106 using the camera's focusing mechanism, the device 102 may estimate the dimensions of the object. In another example, the camera may be a three dimensional (3D) camera that can be used to estimate the dimensions of the object 106.

In one example, the object information may include surface properties of a surface 112 of the object 106. For example, when a 3D camera is used to capture an image of the object 106, the surface properties may include a shape of the surface 112, a texture of the surface 112, a color of the surface 112, and the like. In one example, if the natural light on the object 106 is too low, a flash 114 of the device 102 may be enabled to provide additional light. The additional light may ensure that the image of the object 106 that is captured can be accurately analyzed by the device 102 to obtain the object information.

In one example, the label 110 displayed in the AR image 108 of the object 106 may be modified based on the object information. For example, the label 110 may be modified such that the label 110 appears correctly or without distortion due to some of the object information of the object 106. For example, rather than displaying the label 110 as a perfect rectangle, the label 108 may be modified to be slightly distorted such that the label 110 appears to wrap around the object 106 in the AR image 108. As a result, the user may see the label 110 as it would appear on the object 106 before the label 110 is printed.

In one example, the modifications may include visual changes to label 110. In one example, certain portions of the label 110 may be darkened or lightened to compensate for the texture on the surface 112 of the object 106. In another example, the user may select a background image printed on the label to match a portion of the texture on the surface 112 that the label may cover (as captured by the camera). As a result, the label as a whole may blend in better with the surface 112 of the object 106. In another example, when the label is printed directly onto the surface 112 of the object 106, the modifications may include dispensing more or less ink onto different portions of the surface 112 of the object 106. For example, more roughly textured surfaces may absorb more ink than smooth surfaces.

In another example, the color of the label 110 may be modified to allow the label 110 to be more easily read based on the color of the object 106. For example, if the object information indicates that the object 106 has a light color, or a light color on a portion of the surface 112 that the label 110 may be located, then the device 102 may change the color of the label 110 to a darker color.

It should be noted that the label 110 may be modified automatically by the device 102. In other words, the user does not provide the modifications. The user may provide the desired text and appearance of the text, but the user does not alter the label 110 to correct a distortive effect of the label 110 on the object 106.

Rather, the device 102 may analyze the images of the object 106 to obtain the object information. Based on a location of the label 110 provided in the AR image 108 and the object information, the device 102 may automatically make modifications such that the label 110 does not appear distorted at the location of the surface 112 associated with the obtained object information.

In one example, the label 110 may be alphanumeric text that is to be printed, a graphical image, or a combination of alphanumeric text and graphical images. In other words, rather than printing text onto an adhesive label that can be applied to the surface 112 of the object 106, the text may be directly printed onto the surface 112 of the object 106.

In one example, the display 104 may provide a menu or a graphical user interface (GUI) to allow the user to enter the alphanumeric text for the label 110. The alphanumeric text may be shown on the label 110 on the AR image 108 of the object 106 as the text is entered. The menu or GUI may be used to modify the text in the AR image 108. For example, the font, the size of the text, the colors of the text, a transparency of the text, and the like may be modified by a menu provided in the display 104. In addition, the display 104 may be a touch screen that allows the user to use touch gestures to change a size of the label 110, rotate the label 110, move the label 110, and the like.

In one example after the label 110 is created and modified based on the object information of the object 106, the device 102 may send print parameters to the printer 118. For example, the device 102 may include a communication interface 116 to establish a communication path to the printer 118. The communication interface 116 may be a wired or wireless communication interface.

The print parameters may include the text that was received, modifications made to the text based on the object information, a location of the text on the object 106, and the like. Notably, the print parameters do not include background images around the object 106 (e.g., items around the object 106, images of the environment or room that the object 106 is located in, and the like). Rather, the print parameters are associated with the label 110, and possibly portions of the object 106, that was created in the AR image 108 of the object 106.

The printer 118 may then print a label 120. The label 120 may be applied to the surface 112 of the object 106 and appear on the object 106 as the label 110 appeared in the AR image 108 of the object 106. Thus, the device 102 may provide a "print preview" of the label 110 in the AR image 108 as it would appear on the object 106.

Figure 2:
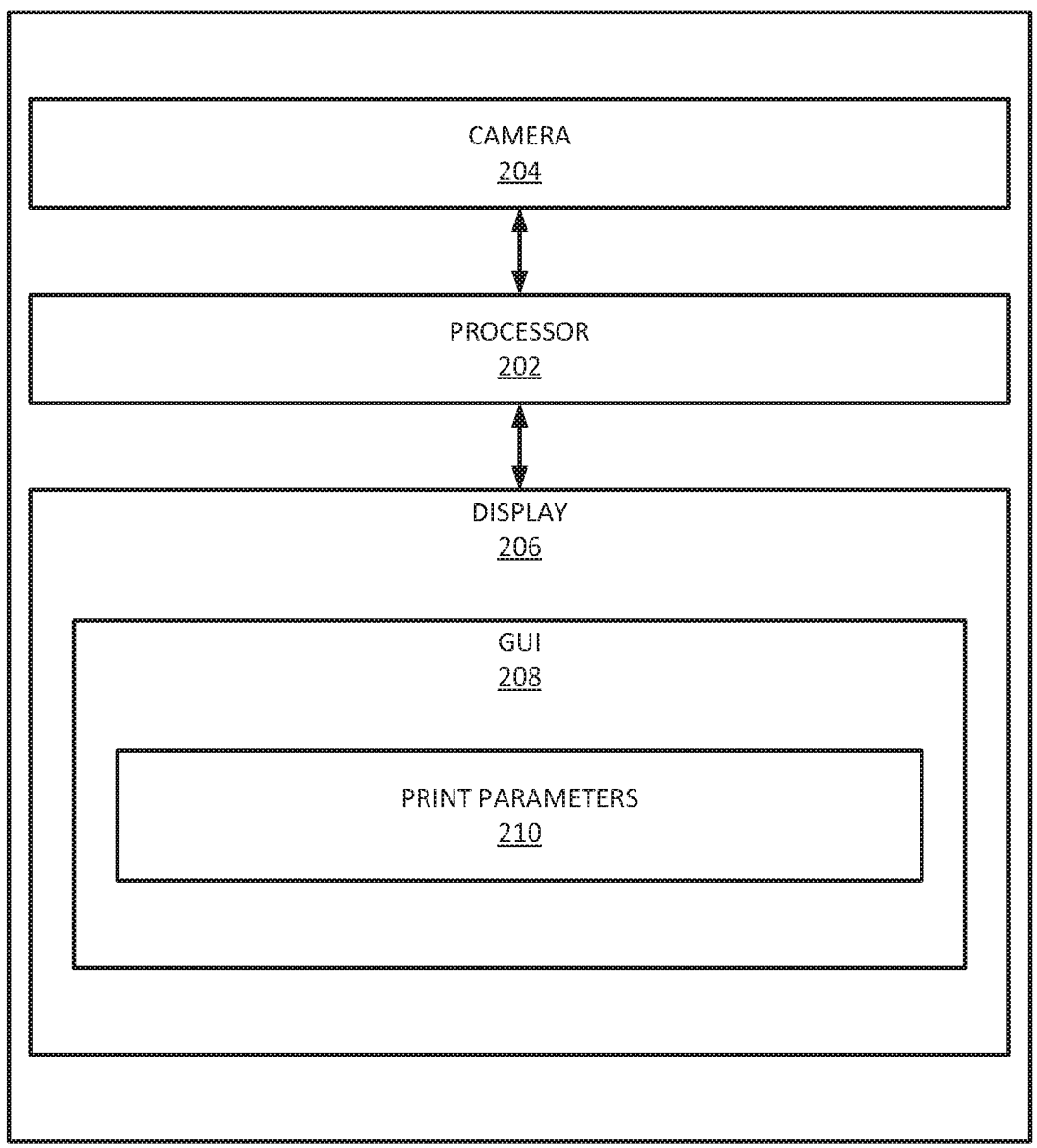
FIG. 2 illustrates a block diagram of an AR labeler of the present disclosure.

FIG. 2 illustrates a block diagram of the device 102. The device 102 may include a processor 202. The processor 202 may be communicatively coupled to a camera 204 and a display 206. The camera 204 may be a red, green, blue (RGB) camera, a 3D camera, and the like. The camera 204 may capture a live view or a photograph of the object 106. The camera 204 may include the flash 114 to provide additional light when the object 106 is in a low light environment.

The images captured by the camera 204 may be transmitted to the processor 202 for analysis. The processor 202 may analyze the images of the object 106 to obtain object information or surface properties of the surface of the object, as described above. As noted above, the object information may include dimensions of the object 106, surface properties of the object 106, and the like. The images of the object 106 may be shown in the display 206 as an AR image. In other words, the AR image may be a mix of real images (e.g., the images of the object 106) and computer generated images (e.g., a preview of a label shown on the real object 106).

The display 206 may include a GUI 208 to provide a menu and/or a touch interface to provide print parameters 210. The print parameters 210 may include text, a font, a text size, a text color, and the like, that are provided via the GUI 208 in the display 206. The GUI 208 may also be used to change a size of the print parameters, an orientation of the print parameters, a location of the print parameters, and the like.

In one example, based on the print parameters 210 and the object information obtained from the analysis of the images of the object 106, the processor 202 may automatically modify the print parameters 210. For example, the print parameters 210 may include having the text all having the same font and font size aligned in a perfect line. However, due to the surface properties of the object 106, the print parameters 210 may be modified.

For example, the processor 202 may determine that the location of the text on the object 106 is a curved surface. The processor 202 may change the size of the font for letters on the ends of the label to compensate for the curved surface. In another example, the processor 202 may add distortion to the dimensions of some letters to compensate for the curvature of the surface 112 of the object 106.

In one example, the processor 202 may modify the print parameters 210 automatically to select a size of the alphanumeric text based on the dimensions of the object 106. In one example, the processor 202 may modify the print parameters 210 automatically to select a size of the print medium to print the label based on the dimensions of the object 106.

After the print parameters 210 are modified, the modified print parameters 210 may be sent to a printer for printing. For example, the device 102 may include the communication interface 116 to send the modified print parameters 210 to the printer 118.

Figure 3:
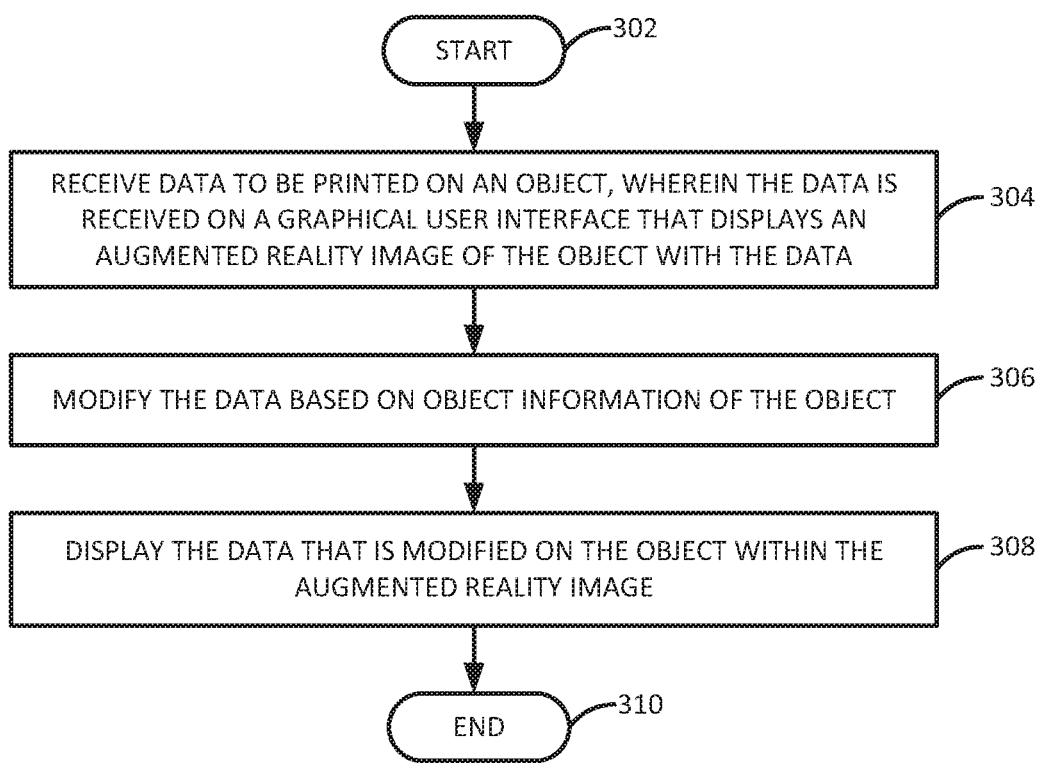
FIG. 3 is a flow chart of an example method for generating a label on an AR image of the present disclosure.

FIG. 3 illustrates a flow diagram of an example method 300 for generating a label on an AR image of the present disclosure. In one example, the method 300 may be performed by the device 102, or the apparatus 400 illustrated in FIG. 4 and described below.

At block 302, the method 300 begins. At block 304, the method 300 receives data to be printed on an object, wherein the data is received on a graphical user interface (GUI) that displays an augmented reality (AR) image of the object with the data. For example, a device with a camera (e.g., a cellphone, a tablet computer, and the like) may capture an image of the object. The image may be a live video of the object or a digital photograph of the object.

The object may be displayed in the AR image on the display of the device. The AR image may include real images (e.g., the object) and computer generated images (e.g., the computer generated data and how the data may look on the object when printed on the object). The data may be alphanumeric text, images, ornamentations, and the like, selected by a user via the GUI, that is to be printed on the object.

In one example, the GUI may provide a menu of options to allow the user to adjust a size of the text, edit the text, select a font of the text, select a design of the text, select a color of the text, a transparency of the text, and the like. The GUI may also allow the user to select a background color, a pattern or image for the label, an ornamentation such as a frame, and the like. The GUI may allow the data to be modified using finger gestures on the touch screen such as pinching two fingers to make the text smaller, spreading the two fingers to make the data larger, turning the data with two fingers to rotate the data, and the like.

At block 306, the method 300 modifies the data based on object information of the object. In one example, the object may be analyzed to obtain object information. The object information may include estimated dimensions of the object, a shape of a surface of the object, a texture of the object, a color of the object, and the like. Based on the object information, the data may be modified automatically by the device. In other words, the modification may not be user initiated, but rather performed by the device based on the object information.

For example, if the object has a curved surface, the data, such as the text or images, may be slightly distorted such that it appears straight around the curved surface. It should be noted that other examples of modifying the data may be evident and within the scope of the present application.

At block 308, the method 300 displays a label that includes the data that is modified on the object within the augmented reality image. The data may include the text and/or any selected images, ornamentations, and the like, selected by the user. The label that is modified is shown on the object as it would appear in reality. As a result, the user may see how the data would look on the object before the label is printed. The AR image provides a print preview of the data on the actual object before the label is printed.

In one example, after the user confirms the modifications to the data and is satisfied with how the data appears on the object, the data with the modifications may be sent to a printer. The printer may print the label with the modified data such that when the label with the modified data is applied to the object, the data may appear on the object as shown in the AR image. At block 310, the method 300 ends.

Figure 4:
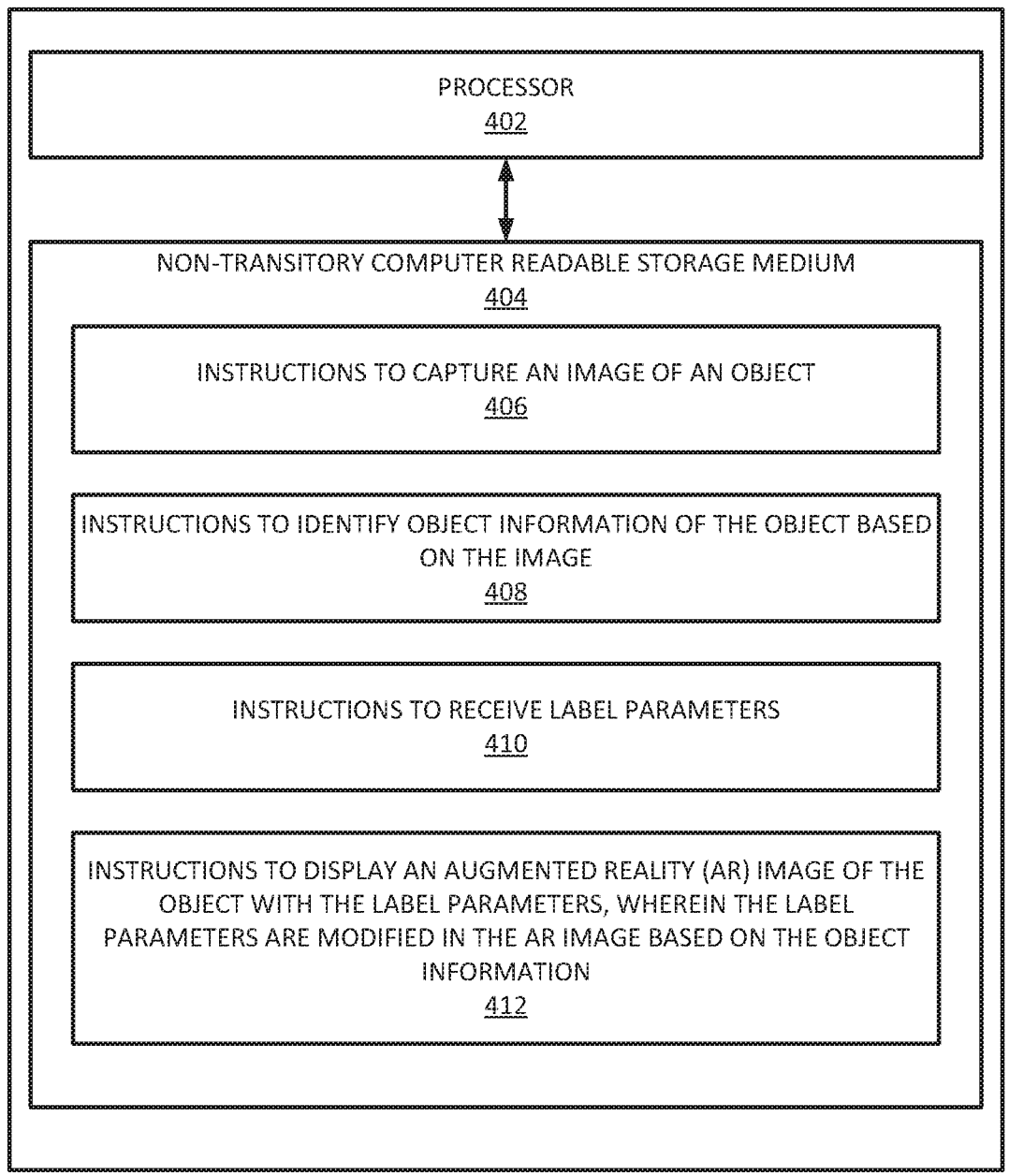
FIG. 4 is a block diagram of an example non-transitory computer readable storage medium storing instructions executed by a processor of the present disclosure.

FIG. 4 illustrates an example of an apparatus 400. In one example, the apparatus 400 may be the device 102. In one example, the apparatus 400 may include a processor 402 and a non-transitory computer readable storage medium 404. The non-transitory computer readable storage medium 404 may include instructions 406, 408, 410, and 412 that, when executed by the processor 402, cause the processor 402 to perform various functions.

In one example, the instructions 406 may include instructions to capture an image of an object. The instructions 408 may include instructions to identify object information of the object based on the image. The instructions 410 may include instructions to receive label parameters. The instructions 412 may include instructions to display an augmented reality (AR) image of the object with the label parameters, wherein the label parameters are modified in the AR image based on the object information.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An augmented reality (AR) labeler, comprising:
a camera to capture an image of an object;
a processor communicatively coupled to the camera to receive the image and determine object information;
a graphical user interface (GUI) communicatively coupled to the processor to receive print parameters; and
a display communicatively coupled to the processor to display an AR image of the object with the print parameters, wherein the print parameters are modified to remove distortion in the AR image to modify the AR image to match the object information obtained from analysis of the image of the object, wherein the object information comprises dimensions of the object, a shape of the object, a texture of a surface of the object, and a color of the surface of the object.

2. The AR labeler of claim 1, wherein the camera comprises a three dimensional camera.

3. The AR labeler of claim 1, wherein the print parameters comprise text and a location of the text on the object selected in the AR image.

4. The AR labeler of claim 1, further comprising:
a communication interface to transmit the print parameters that are modified to a printer.

5. The AR labeler of claim 1, further comprising:
a flash to provide light when the image of the object is captured in a low light environment.

6. A non-transitory computer readable storage medium encoded with instructions executable by a processor, the non-transitory computer-readable storage medium comprising:
instructions to capture an image of an object;
instructions to identify object information of the object based on the image;
instructions to receive label parameters; and
instructions to display an augmented reality (AR) image of the object with the label parameters, wherein the label parameters are modified to match the object information to remove distortion in the AR image, wherein the object information comprises dimensions of the object, a shape of the object, a texture of a surface of the object, and a color of the surface of the object.

7. The non-transitory computer readable storage medium of claim 6, further comprising:
instructions to transmit the label parameters that are modified to a printer.

8. The non-transitory computer readable storage medium of claim 6, wherein the image comprises a live view of the object.

9. A method, comprising:
receiving, by a processor, data to be printed on an object, wherein the data is received on a graphical user interface that displays an augmented reality image of the object with the data;
modifying, by the processor, the data to match the object information of the object to remove distortion from a label that is to be displayed on the object in the augmented reality image, wherein the object information comprises dimensions of the object, a shape of the object, a texture of a surface of the object, and a color of the surface of the object; and
display, by the processor, the label that includes the data that is modified on the object within the augmented reality image.

10. The method of claim 9, further comprising:
transmitting, by the processor, the data that is modified to a printer to be printed onto the object.

* * * * *